United States Patent

[11] 3,610,678

| [72] | Inventor | Donald D. Brokaw |
| | | Howell, Mich. |
| [21] | Appl. No. | 20,999 |
| [22] | Filed | Mar. 19, 1970 |
| [45] | Patented | Oct. 5, 1971 |
| [73] | Assignee | General Motors Corporation |
| | | Detroit, Mich. |

[54] SPARE WHEEL MOUNTING CLAMP
2 Claims, 5 Drawing Figs.

[52] U.S. Cl. .................................................. 296/37.2,
224/42.13
[51] Int. Cl. ...................................................... B62d 43/08
[50] Field of Search .......................................... 296/37.2,
37 R, 37 A; 224/42.13, 42.19

[56] References Cited
UNITED STATES PATENTS
1,713,367  5/1929  Boehm .......................... 296/37.2 UX
2,647,012  7/1953  Walker .......................... 296/37.2

*Primary Examiner*—Benjamin Hersh
*Assistant Examiner*—John A. Pekar
*Attorneys*—W. E. Finken and Herbert Furman ABSTRACT: A vehicle includes inner and outer walls vertically positioned in opposed relationship longitudinally of the vehicle to partially define a vertical spare wheel well. A spare wheel is positioned within the well with the wheel axis normal to the walls. A clamp includes first and second hinged clamp members. The first clamp member has an end portion engageable with the inner wall. The second clamp member has an end portion engageable with a jack base positioned on the wheel on the side thereof facing the inner wall. The clamp members move between an initial position and an overcenter clamping position forcing the spare wheel against the outer wall to thereby mount the spare wheel within the well. Stops on the first and second clap members cooperate to prevent movement of the clamp members past the overcenter clamping position.

PATENTED OCT 5 1971

3,610,678

INVENTOR.
Donald D. Brokaw
BY
Herbert Furman
ATTORNEY

SPARE WHEEL MOUNTING CLAMP

This invention relates to a clamp for mounting a spare wheel within a vertical spare wheel well of a vehicle.

It is well known to use a clamp for mounting a spare wheel within a vertical spare wheel well. Conventionally, one of the well walls supports the clamp which extends through the center wheel opening to force the spare wheel against the wall supporting the clamp to thereby mount the spare wheel within the well. It is therefore necessary to guide the clamp through the center wheel opening during the mounting of the spare wheel. This invention provides a clamp for mounting the spare wheel which remains on one side thereof at all times. Therefore it is not necessary to guide the clamp through the center wheel opening during the mounting of the spare wheel.

An object of this invention is to provide a clamp for mounting a spare wheel within a vertical spare wheel well wherein the clamp remains on one side of the wheel during the selective mounting or removal of the wheel.

In carrying out this object, the clamp includes first and second hinged clamp members respectively engageable with a first well wall and with the wheel on the side thereof facing the first well wall. The clamp members move between an initial position and an overcenter clamping position forcing the spare wheel against a second well wall to thereby mount the spare wheel within the well.

IN THE DRAWINGS

Figure 1:
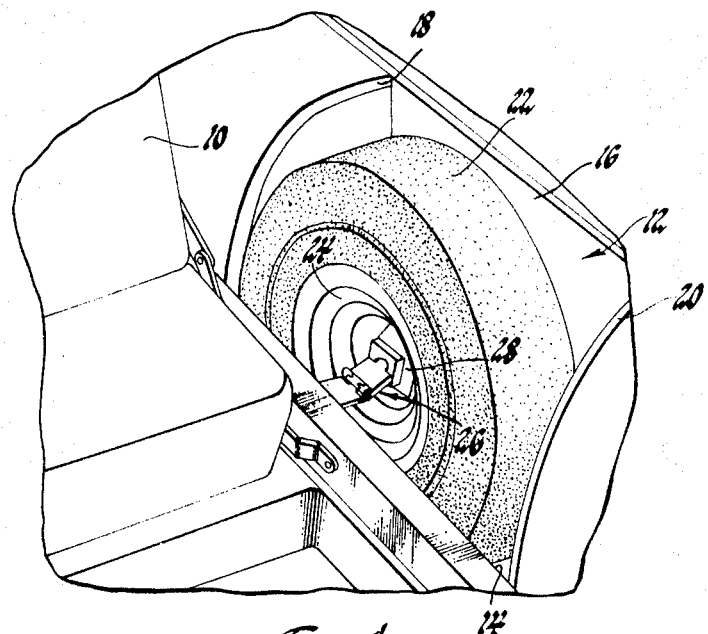
FIG. 1 is a perspective view of a vertical spare wheel well with a spare wheel mounted therein by a clamp according to the invention.
Figure 2:
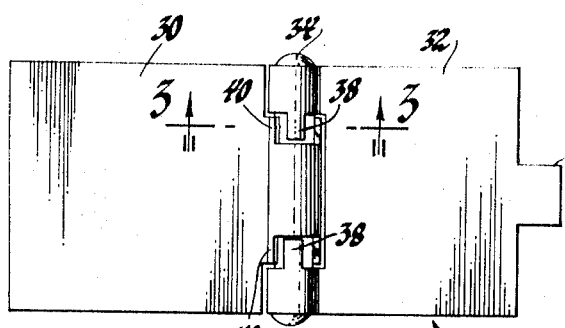
FIG. 2 is an enlarged top view of the clamp removed from the well.
Figure 3:
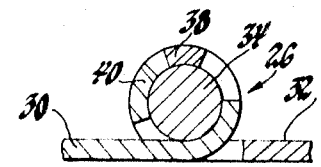
FIG. 3 is an enlarged sectional view taken along line 3—3 of FIG. 2.

Referring to FIG. 1, the interior of a vehicle includes a seat 10 and a vertical spare wheel well 12. The well 12 is defined by an inner panel or wall 14, an outer panel or wall 16, and end panels or walls 18 and 20. A spare wheel 22 includes a conventional wheel 24 and is mounted within the well 12 by a clamp 26. The clamp 26 is engageable with the inner wall 14 and a jack base 28 to force the spare wheel 22 against the outer wall 16 and thus mount the spare wheel 22 within the well 12. Although a jack base is shown, it is also possible to use a special mounting plate or to have the clamp directly engageable with the wheel 24.

Moving the FIGS. 2 through 5, the clamp 26 includes first and second clamp members 30 and 32 pivotally connected by a hinge pin 34. Clamp member 32 includes a mounting tang 36 and stop tangs 38 which cooperate with stop abutments 40 on clamp member 30 as will be described.

Figure 5:
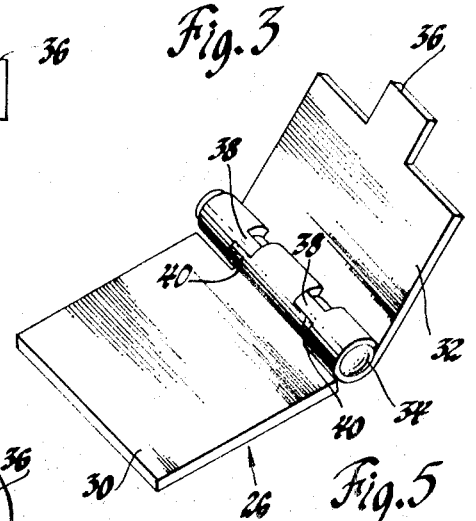
FIG. 5 is a perspective view of the clamp with the clamp members oriented in the overcenter clamping position to show the stops that cooperate to prevent movement past this position.
Figure 4:
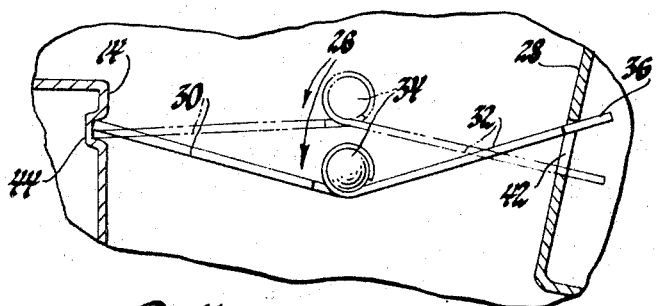
FIG. 4 is a side view of the clamp shown in a phantom line initial position and a solid line overcenter clamping position.

To mount the spare wheel 22 within the well 12, the mounting tang 36 of clamp member 32 is inserted within an aperture 42 in the jack base 28 positioned on the wheel 24 as shown in FIG. 1. Similarly, clamp member 30 is positioned within a stamped groove 44 in the inner wall 14 to position the clamp 26 in an initial position as shown by phantom lines in FIG. 4. From this initial position, a downward force moves the clamp 26 to an overcenter clamping position shown by solid lines in FIG. 4. As shown in FIG. 5, the stop tangs 38 and the stop abutments 40 cooperate to prevent movement of the clamp 26 past the overcenter clamping position.

In the overcenter clamping position, the clamp 26 forces the spare wheel 22 against the outer wall 16 and thus mounts the spare wheel 22 within the well 12 while remaining on one side of the wheel 24.

It can thus be seen that it is not necessary to guide the clamp through the center wheel opening during the selective mounting or removal of the spare wheel.

What is claimed is:

1. In a vehicle including first and second walls positioned substantially vertically in opposed relationship to partially define a substantially vertical spare wheel well, a spare wheel positioned within the well with the axis thereof substantially normal to the walls, and a clamp comprising: a first clamp member including an end portion engageable with the first wall; a second clamp member including an end portion engageable with the wheel at the side thereof facing the first wall; connecting means connecting the clamp members for movement between an initial position and an overcenter clamping position forcing the wheel against the second wall to thereby mount the wheel within the well; and stop means preventing movement of the clamp members past the overcenter clamping position.

2. In a vehicle including first and second walls positioned substantially vertically in opposed relationship to partially define a substantially vertical spare wheel well, a spare wheel positioned within the well with the axis thereof substantially normal to the walls, and a clamp comprising: a first clamp member including an end portion engageable with the first wall; a second clamp member including an end portion engageable with the wheel at the side thereof facing the first wall; connecting means pivotally connecting the clamp members for movement between an initial position and an overcenter clamping position forcing the wheel against the second wall to thereby mount the wheel within the well; and stop means including first and second stop portions respective to the first and second clamp members, said stop portions cooperating to prevent movement of the clamp members past the overcenter clamping position.